United States Patent
Kim et al.

(10) Patent No.: US 9,979,197 B2
(45) Date of Patent: May 22, 2018

(54) MICRO-GRID ENERGY MANAGEMENT SYSTEM

(71) Applicant: Electronics and Telecommunications Research Institute, Daejeon (KR)

(72) Inventors: Jong Won Kim, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 15/166,949

(22) Filed: May 27, 2016

(65) Prior Publication Data
US 2017/0194790 A1   Jul. 6, 2017

(30) Foreign Application Priority Data
Jan. 5, 2016 (KR) .......................... 10-2016-0000866

(51) Int. Cl.
*G05D 3/12* (2006.01)
*H02J 3/38* (2006.01)

(52) U.S. Cl.
CPC .............. *H02J 3/381* (2013.01); *Y02E 10/50* (2013.01); *Y02E 60/528* (2013.01)

(58) Field of Classification Search
CPC .......... H02J 3/381; H04L 12/10; G05B 15/02; Y02E 10/50; Y02E 60/528
See application file for complete search history.

(56) References Cited

U.S. PATENT DOCUMENTS

| | | | |
|---|---|---|---|
| 6,701,192 B1 * | 3/2004 | Herwig | G06Q 20/20 235/2 |
| 8,682,495 B2 | 3/2014 | Carralero et al. | |
| 9,031,707 B2 | 5/2015 | Park et al. | |
| 9,086,691 B2 | 7/2015 | Carralero et al. | |
| 9,158,294 B2 | 10/2015 | Carralero et al. | |

(Continued)

FOREIGN PATENT DOCUMENTS

| KR | 10-0928186 B1 | 11/2009 |
|---|---|---|
| KR | 10-2013-0123372 A | 11/2013 |
| KR | 10-1412742 B1 | 7/2014 |

*Primary Examiner* — Vincent Tran
(74) *Attorney, Agent, or Firm* — LRK Patent Law Firm

(57) ABSTRACT

Micro-grid energy management system includes distributed power generation and storage devices each configured to generate and store power in a distributed manner, monitor its own status, and transmit data on the monitored status through a different interface, a gateway device connected selectively with the distributed power generation and storage devices through different interfaces and configured to convert the status data received through the interfaces into open data having one predefined data frame format, transmit the converted open data over a network, and provide control signals of the distributed power generation and storage devices received over the network to the distributed power generation and storage devices; and an energy management server configured to perform energy management using the open data transmitted from the gateway device over the network and transmit control signals for controlling and managing the distributed power generation and storage devices to the gateway device over the network.

17 Claims, 5 Drawing Sheets

(56) References Cited

U.S. PATENT DOCUMENTS

| | | | |
|---|---|---|---|
| 2002/0091843 A1* | 7/2002 | Vaid | H04L 12/2865 709/230 |
| 2010/0076613 A1* | 3/2010 | Imes | G06Q 50/06 700/287 |
| 2010/0264739 A1* | 10/2010 | Errington | H02J 1/10 307/80 |
| 2012/0101639 A1* | 4/2012 | Carralero | G06F 1/26 700/286 |
| 2013/0062944 A1* | 3/2013 | Prosser | H02J 4/00 307/29 |
| 2013/0091293 A1* | 4/2013 | Roshen | G06F 9/546 709/230 |
| 2013/0249298 A1* | 9/2013 | Dong | H02J 3/005 307/80 |
| 2015/0207459 A1 | 7/2015 | Choi et al. | |
| 2016/0049794 A1* | 2/2016 | Liu | H02J 3/38 307/24 |
| 2017/0005515 A1* | 1/2017 | Sanders | H02J 3/381 |

\* cited by examiner

FIG. 5

| DATA FRAME FORMAT OF OPEN DATA OF DISTRIBUTED POWER GENERATION AND STORAGE DEVICE | | | |
|---|---|---|---|
| ID OF DISTRIBUTED POWER GENERATION AND STORAGE DEVICE | MONITORING ITEM (b Bytes) | STATUS INFORMATION (c Bytes) | TIME INFORMATION (d Bytes) | ated
MICRO-GRID ENERGY MANAGEMENT SYSTEM

CROSS-REFERENCE TO RELATED APPLICATION

This application claims priority to and the benefit of Korean Patent Application No. 10-2016-0000866, filed on Jan. 5, 2016, the disclosure of which is incorporated herein by reference in its entirety.

BACKGROUND

1. Field of the Invention

The present disclosure relates to a micro-grid energy management system, and more particularly, to a micro-grid energy management system configured to monitor a plurality of distributed power generation and storage devices for a micro-grid that are connected with one another through different communication interfaces and control statuses of the distributed power generation and storage devices.

2. Discussion of Related Art

A conventional independent micro-grid control system can provide only a wired serial communication function as a communication scheme between a gateway and distributed power generation and storage devices. Accordingly, various wired/wireless communication functions, modular communication devices that are individually attachable or detachable, a function of conversion into open data having a unified data frame format by accommodating various communication protocols such as the Ethernet, Modbus, SUN, and PLC, and a function of converting the open data having the unified data frame format according to a representational state transfer (REST) web server protocol and transmitting the open data over the Internet cannot be provided.

SUMMARY OF THE INVENTION

The present invention is directed to a micro-grid energy management system configured to accommodate various communication protocols to perform conversion into open data having a unified data frame format, convert the open data having the unified data frame format according to a REST web server protocol, and transmit the open data over the Internet.

According to an aspect of the present disclosure, there is provided a micro-grid energy management system including: a plurality of distributed power generation and storage devices each configured to generate and store power in a distributed manner, monitor its own status, and transmit data on the monitored status through a different interface; a gateway device connected selectively with the plurality of distributed power generation and storage devices through different interfaces and configured to convert the status data received through the interfaces into open data having one predefined data frame format, transmit the converted open data over a network, and provide control signals of the plurality of distributed power generation and storage devices received over the network to the plurality of distributed power generation and storage devices; and an energy management server configured to perform energy management using the open data transmitted from the gateway device over the network and transmit control signals for controlling and managing the distributed power generation and storage devices to the gateway device over the network.

The plurality of distributed power and storage devices may be selectively connected or disconnected from the gateway device.

The plurality of distributed power and storage devices may include a plurality of photovoltaic modules connected with the gateway device through an Ethernet communication interface and a wireless interface; a lithium ion battery connected with the gateway device through an RS-485 Modbus communication interface; a vanadium redox flow battery connected with the gateway device through an Ethernet Modbus communication interface; a diesel generator connected with the gateway device through an Ethernet communication interface; and a wind generator connected with the gateway device through a PLC power communication interface.

The gateway device may include a modular wired/wireless communication unit configured in a modular form so that the gateway device is connected with the plurality of distributed power generation and storage devices through the different communication interfaces, and configured to receive the status data of the plurality of distributed power generation and storage devices through the communication interfaces and selectively transmit control signals for controlling the distributed power generation and storage devices to the distributed power generation and storage devices; a gateway central processing unit configured to convert the status data of the plurality of distributed power generation and storage devices received through the modular wired/wireless communication unit into transmission data, output the converted transmission data, and provide the control signals of the distributed power generation and storage devices transmitted from the energy management server to the modular wired/wireless communication unit; an open data processing unit configured to convert the transmission data converted by the gateway central processing unit into a predefined open data frame, convert the converted open data frame into open data corresponding to a representational state transfer (REST) web server protocol, and output the converted open data; and an Ethernet communication unit configured to convert the open data output from the open data processing unit into Ethernet data, transmit the Ethernet data to the energy management server over the Internet, and provide Ethernet control signals of the plurality of distributed power generation and storage devices transmitted from the energy management server to the gateway central processing unit.

The status data may include at least one of ID information, monitoring item information, status information, and monitoring time information of the plurality of distributed power generation and storage devices, and the status information may include at least one of power generation information, power storage information, and power charging/discharging information.

The modular wired/wireless communication unit may include a plurality of communication modules connected with the plurality of distributed power generation and storage devices through corresponding communication interfaces and configured to receive the status data transmitted from the plurality of distributed power generation and storage devices through the communication interfaces; and an input data concentrator configured to align and concentrate the status data of the plurality of distributed power generation and storage devices received through the communication modules in an input order, provide the aligned and concentrated status data to the gateway central processing unit, and provide the control signals provided from the gateway central processing unit so that the control signals are selectively transmitted to the communication modules.

The open data processing unit may include an open data reception queue configured to temporarily store the status data of the plurality of distributed power generation and storage devices provided from the gateway central processing unit and then output the stored status data; an open data converter configured to convert the status data of the plurality of distributed power generation and storage devices output from the open data reception queue into a predefined open data frame and output the converted open data frame; and an open data transmission queue configured to temporarily store the data frame converted by the open data converter and then provide the stored data frame to the Ethernet communication unit.

The predefined open data frame may include a field including ID information of the plurality of distributed power generation and storage devices, a field including monitoring item information of the plurality of distributed power generation and storage devices; a field including status information of the plurality of distributed power generation and storage devices; and a field including monitoring time information for monitoring items of the plurality of distributed power generation and storage devices.

According to another aspect of the present disclosure, there is provided a gateway device of a micro-grid energy management system, the gateway device including a modular wired/wireless communication unit configured in a modular form so that the gateway device is connected with a plurality of distributed power generation and storage devices through different communication interfaces, and configured to receive the status data of the plurality of distributed power generation and storage devices through the communication interfaces and selectively transmit control signals for controlling the distributed power generation and storage devices to the plurality of distributed power generation and storage devices; a gate central processing unit configured to convert the status data of the plurality of distributed power generation and storage devices received through the modular wired/wireless communication unit into transmission data, output the converted transmission data, and provide the control signals of the distributed power generation and storage devices transmitted from an energy management server to the modular wired/wireless communication unit; an open data processing unit configured to convert the transmission data converted by the gateway central processing unit into a predefined open data frame, convert the converted open data frame into open data corresponding to a representational state transfer (REST) web server protocol, and output the converted open data; and an Ethernet communication unit configured to convert the open data output from the open data processing unit into Ethernet data, transmit the Ethernet data to the energy management server over the Internet, and provide Ethernet control signals of the plurality of distributed power generation and storage devices transmitted from the energy management server to the gateway central processing unit.

The status data may include at least one of ID information, monitoring item information, status information, and monitoring time information of the plurality of distributed power generation and storage devices, and the status information may include at least one of power generation information, power storage information, and power charging/discharging information.

The modular wired/wireless communication unit may include a plurality of communication modules connected with the plurality of distributed power generation and storage devices through corresponding communication interfaces and configured to receive the status data transmitted from the plurality of distributed power generation and storage devices through the communication interfaces; and an input data concentrator configured to align and concentrate the status data of the plurality of distributed power generation and storage devices received through the communication modules in an input order, provide the aligned and concentrated status data to the gateway central processing unit, and provide the control signals provided from the gateway central processing unit so that the control signals are selectively transmitted to the communication modules.

The open data processing unit may include an open data reception queue configured to temporarily store the status data of the plurality of distributed power generation and storage devices provided from the gateway central processing unit and then output the stored status data; an open data converter configured to convert the status data of the plurality of distributed power generation and storage devices output from the open data reception queue into a predefined open data frame and output the converted open data frame; and an open data transmission queue configured to temporarily store the data frame converted by the open data converter and then provide the stored data frame to the Ethernet communication unit.

The predefined open data frame may include a field including ID information of the plurality of distributed power generation and storage devices, a field including monitoring item information of the plurality of distributed power generation and storage devices; a field including status information of the plurality of distributed power generation and storage devices; and a field including monitoring time information for monitoring items of the plurality of distributed power generation and storage devices.

The plurality of communication module may include an Ethernet data communication module configured to transmit or receive data to or from the plurality of distributed power generation and storage devices through an Ethernet interface; a wireless data communication module configured to transmit or receive data to or from the plurality of distributed power generation and storage devices through a wireless interface; an RS-485 Modbus data communication module configured to transmit or receive data to or from the plurality of distributed power generation and storage devices through an RS-485 Modbus communication interface; an Ethernet Modbus data communication module configured to transmit or receive data to or from the plurality of distributed power generation and storage devices through an Ethernet Modbus communication interface; and a PLC data communication module configured to transmit or receive data to or from the plurality of distributed power generation and storage devices through a PLC power line.

The modular wired/wireless communication unit may be configured in a modular form to be connected or disconnected from the plurality of distributed power generation and storage devices.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 is a view showing an open data frame structure that is provided to an Ethernet communication unit by the open data processing unit shown in FIG. 2.

DETAILED DESCRIPTION OF EXEMPLARY EMBODIMENTS

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A micro-grid energy management system according to an embodiment of the present disclosure will be described below in more detail with reference to the accompanying drawings.

Figure 1:
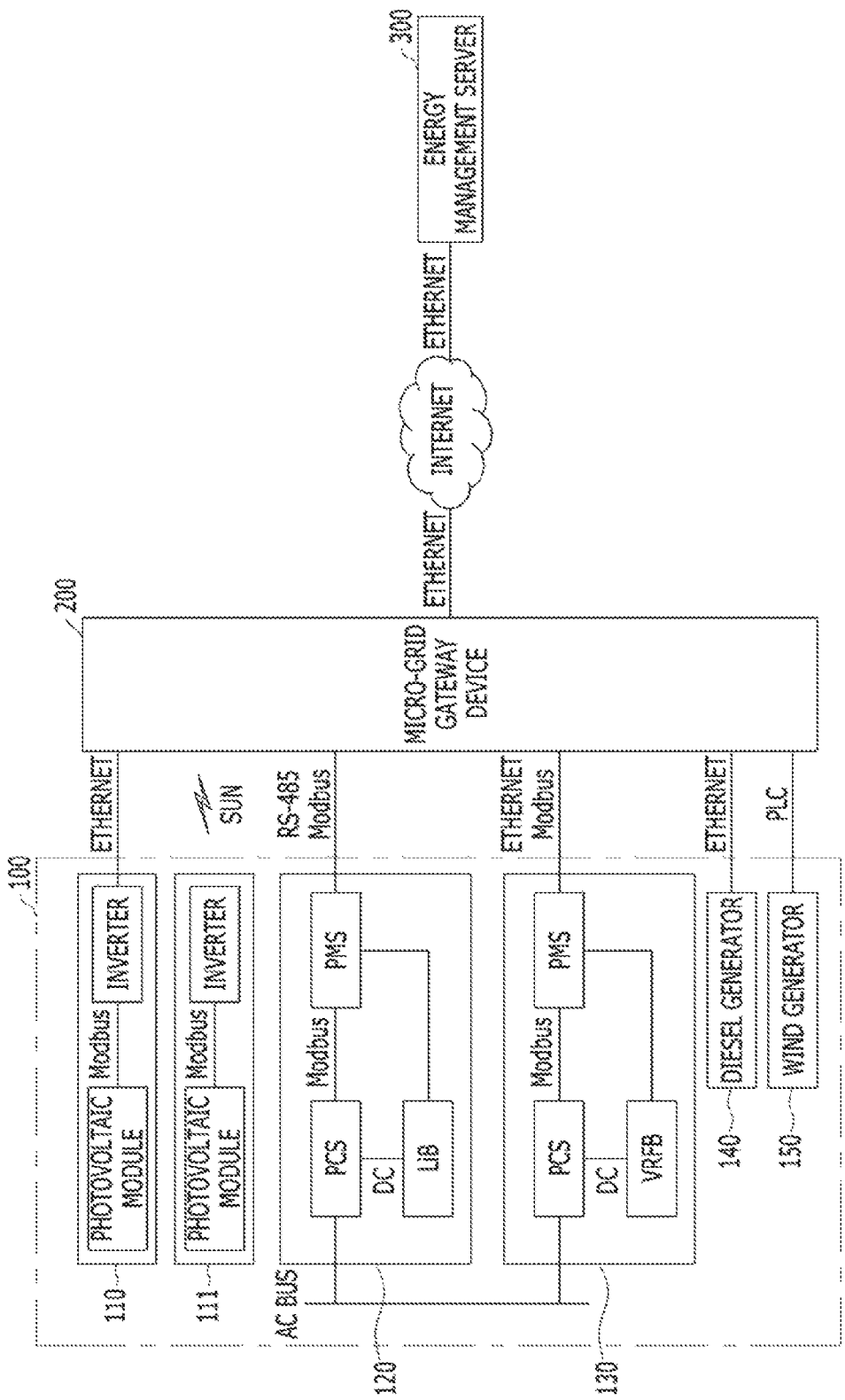
FIG. 1 is a view showing a configuration and a network connection relationship of a micro-grid energy management system according to an embodiment of the present disclosure.

FIG. 1 is a view showing a configuration and a network connection relationship of a micro-grid energy management system according to an embodiment of the present disclosure.

As shown in FIG. 1, the micro-grid energy management system according to an embodiment of the present disclosure may include a distributed power generation and storage device 100, a micro-grid gateway device 200, and an energy management server 300.

The distributed power generation and storage device 100 may include a plurality of photovoltaic modules 110 and 111, a lithium ion battery 120, a vanadium redox flow battery 130, a diesel generator 140, and a wind generator 150. Here, the elements of the distributed power generation and storage device 100 may be connected with the micro-grid gateway device 200 through different communication interfaces.

For example, the photovoltaic module 110 may be connected with the micro-grid gateway device 200 through an Ethernet communication interface, and the photovoltaic module 111 may be connected with the micro-grid gateway device 200 through a wireless communication interface.

The lithium ion battery 120 may be connected with the micro-grid gateway device 200 through an RS-485 Modbus communication interface, and the vanadium redox flow battery 130 may be connected with the micro-grid gateway device 200 through an Ethernet Modbus communication interface.

The diesel generator 140 may be connected with the micro-grid gateway device 200 through an Ethernet communication interface, and the wind generator 150 may be connected with the micro-grid gateway device 200 through a PLC communication interface.

Meanwhile, the elements of the distributed power generation and storage device 100 may be configured to be attachable to or detachable from the micro-grid gateway device 200. Here, the elements of the distributed power generation and storage device 100 are well known in the art, and thus the description of their detailed configurations or operations will be omitted.

The micro-grid gateway device 200 receives status data transmitted through an Ethernet communication interface from the photovoltaic module 110 and receives status data transmitted through wireless communication (e.g., SUN communication) from the photovoltaic module 111.

Also, the micro-grid gateway device 200 receives status data transmitted through the RS-485 Modbus communication interface from the lithium ion battery 120 and receives status data transmitted through the Ethernet Modbus communication interface from the vanadium redox flow battery 130.

The micro-grid gateway device 200 receives status data transmitted through an Ethernet communication interface from the diesel generator 140 and receives status data transmitted through a PLC power line communication interface from the wind generator 150. Here, the status data respectively transmitted through different interfaces from the elements of the distributed power generation and storage device 100 may include power information, that is, power generation information, power storage information, power charging/discharging information, etc.

The micro-grid gateway device 200 converts the status data received from each element of the distributed power generation and storage device 100 into open data having one predefined unified data frame format.

Also, the micro-grid gateway device 200 converts the converted open data according to a representational state transfer (REST) web server protocol and transmits the open data to the energy management server 300 over the Internet.

The micro-grid gateway device 200 receives a control signal for controlling a status of the distributed power generation and storage device 100 from the energy management server 300 over the Internet and performs a function of controlling and setting up the plurality of photovoltaic modules 110 and 110, the lithium ion battery 120, the vanadium redox flow battery 130, the diesel generator 140, and the wind generator 150.

The energy management server 300 predicts a load and a distributed power generation amount using the status data of the distributed power generation and storage device 100 transmitted from the micro-grid gateway device 200 over the Internet, and performs optimal operation management of the distributed power generation and storage device 100.

The energy management server 300 analyzes economic feasibility and efficiency of the micro-grid using the status data transmitted from the micro-grid gateway device 200 and transmits information regarding management, control, and various set-ups of the distributed power generation and storage device 100 to the micro-grid gateway device 200 over the Internet.

Meanwhile, a detailed configuration and operation of the micro-grid gateway device 200 will be described below in detail with reference to FIGS. 2 to 5.

Figure 2:
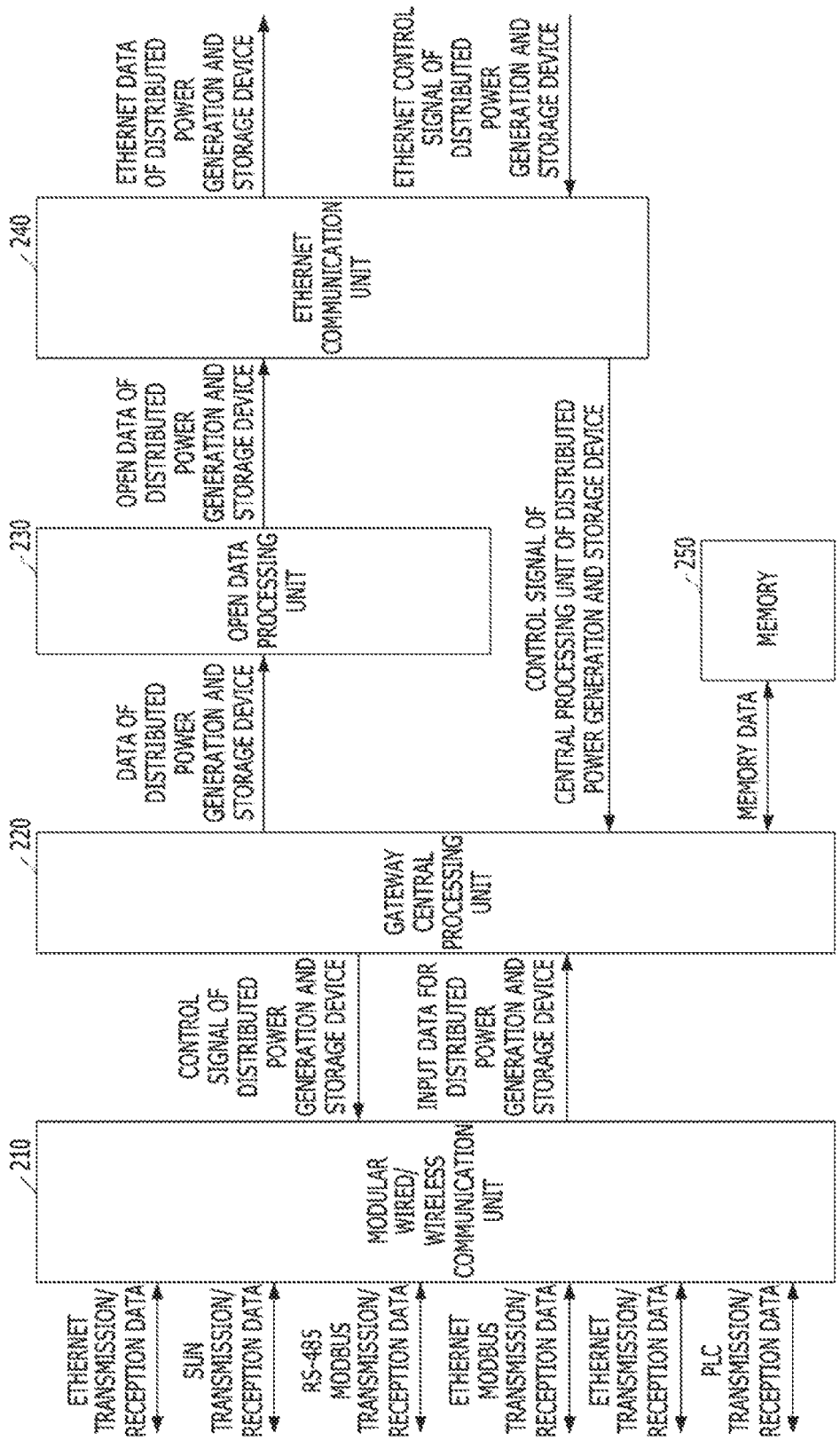
FIG. 2 is a detailed block diagram of a micro-grid gateway device shown in FIG. 1.
Figure 3:
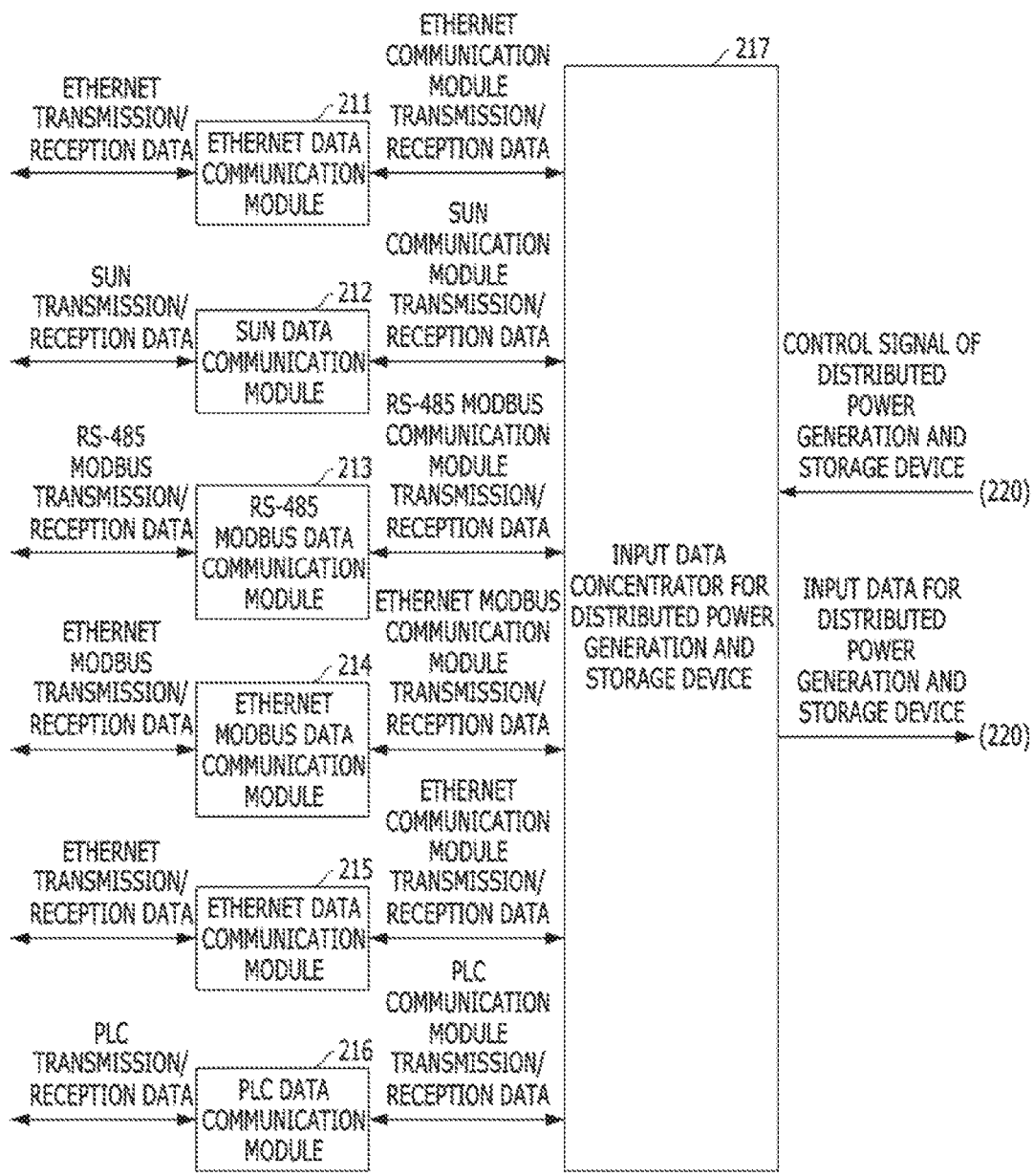
FIG. 3 is a detailed block diagram of a modular wired/wireless communication unit shown in FIG. 2.
Figure 4:
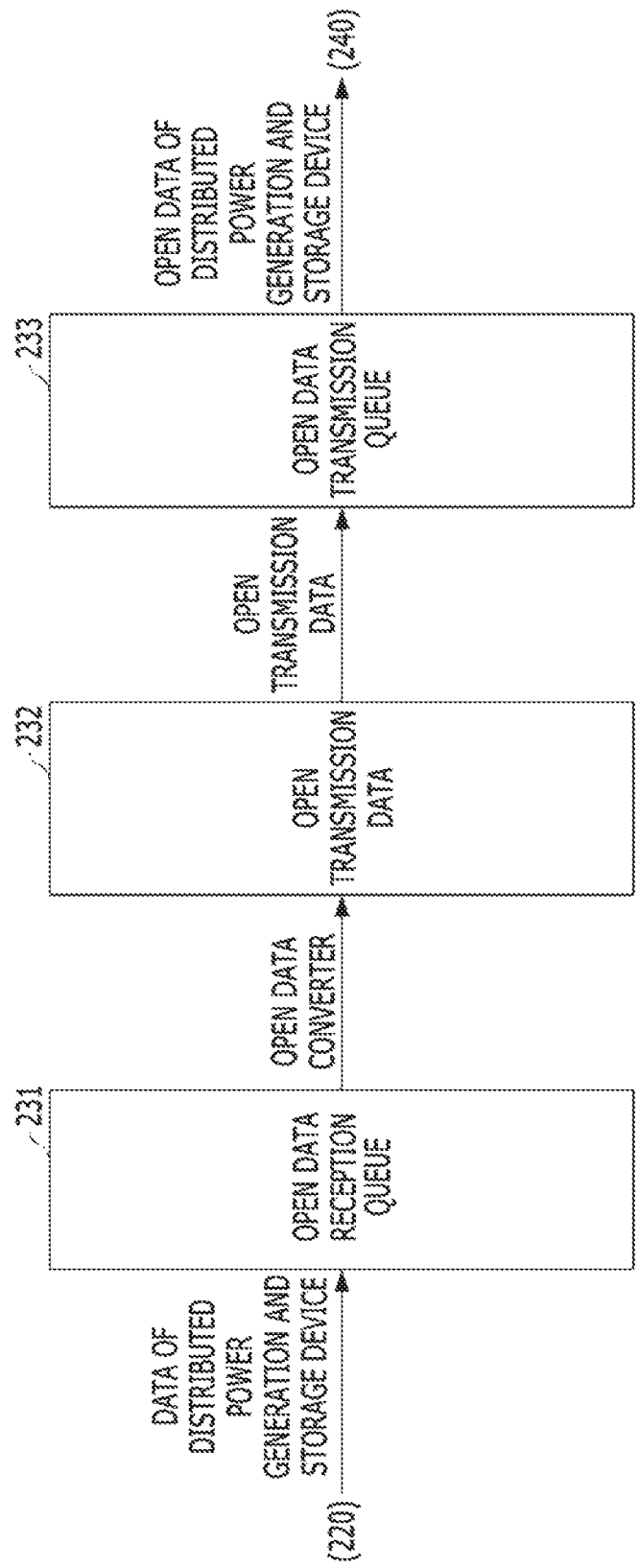
FIG. 4 is a detailed block diagram of an open data processing unit shown in FIG. 2.

FIG. 2 is a detailed block diagram of a micro-grid gateway device 200 shown in FIG. 1, FIG. 3 is a detailed block diagram of a modular wired/wireless communication unit 210 shown in FIG. 2, FIG. 4 is a detailed block diagram of an open data processing unit 230 shown in FIG. 2, and FIG. 5 is a view showing an open data frame structure that is provided to an Ethernet communication unit 240 by the open data processing unit 230 shown in FIG. 2.

As shown in FIG. 2, the micro-grid gateway device 200 may include a modular wired/wireless communication unit 210, a gateway central processing unit 220, an open data processing unit 230, an Ethernet communication unit 240, and a memory 250.

The modular wired/wireless communication unit 210 receives a control signal for controlling the distributed power generation and storage device 100 from the gateway central processing unit 220 and provides the control signal to the distributed power generation and storage device 100.

In detail, the modular wired/wireless communication unit 210 controls the photovoltaic module 110 according to a control signal provided from the gateway central processing unit 220 and transmits Ethernet transmission data including various types of setup information to the photovoltaic module 110 through an Ethernet line.

The modular wired/wireless communication unit 210 controls the photovoltaic module 111 according to a control signal provided from the gateway central processing unit 220 and transmits SUN transmission data including various types of setup information to the photovoltaic module 111 in a wireless manner.

The modular wired/wireless communication unit 210 controls the lithium ion battery 120 according to a control signal provided from the gateway central processing unit 220 and transmits RS-485 Modbus transmission data including various types of setup information to the lithium ion battery 120 through an RS-485 line.

Also, the modular wired/wireless communication unit 210 controls the vanadium redox flow battery 130 according to the control signal provided from the gateway central processing unit 220 and transmits Ethernet Modbus transmission data including various types of setup information to the vanadium redox flow battery 130 through an Ethernet line.

The modular wired/wireless communication unit 210 controls the diesel generator 140 according to the control signal provided from the gateway central processing unit 220, transmits Ethernet transmission data including various types of setup information to the diesel generator 140 through an Ethernet line, and transmits PLC transmission data including control information and various types of setup information of the wind generator 150 to the wind generator 150 through a power line.

Also, the modular wired/wireless communication unit 210 receives status data transmitted through an Ethernet communication interface from the photovoltaic module 110 and receives status data transmitted through wireless communication (e.g., SUN communication) from the photovoltaic module 111 in a wireless manner.

In addition, the micro-grid gateway device 200 receives status data transmitted through the RS-485 Modbus communication interface from the lithium ion battery 120 and receives status data transmitted through the Ethernet Modbus communication interface from the vanadium redox flow battery 130.

The micro-grid gateway device 200 receives status data transmitted through an Ethernet communication interface from the diesel generator 140 and receives status data transmitted through the PLC power line communication interface from the wind generator 150.

The micro-grid gateway device 200 aligns the status data received from each element of the distributed power generation and storage device 100 in sequence, concentrates the aligned status data, converts the concentrated status data into input data for the distributed power generation and storage device, and then provides the input data for the distributed power generation and storage device to the gateway central processing unit 220.

The gateway central processing unit 220 receives input data for the distributed power generation and storage device 100 from the modular wired/wireless communication unit 210, converts the input data into setup data of the distributed power generation and storage device, and provides the converted data into the open data processing unit 230.

The gateway central processing unit 220 receives a control signal that is provided from the Ethernet communication unit 240, converts the received control signal into a status control signal and various setup control signals of the distributed power generation and storage device 100, and provides the information to the modular wired/wireless communication unit 210.

The memory 250 stores a program and data for data processing by the gateway central processing unit 220.

The open data processing unit 230 receives status data of the distributed power generation and storage device 100 from the gateway central processing unit 220, converts the received status data into an open data frame as shown in FIG. 5, and provides the open data frame to the Ethernet communication unit 240. Here, the data frame of the open data into which the status data is converted by the open data processing unit 230 includes a field including an ID of the distributed power generation and storage device 100, a field including information about an monitoring item of the distributed power generation and storage device 100, a field including the status information of the distributed power generation and storage device 100, and a field including monitoring time information about the items.

The Ethernet communication unit 240 receives the open data frame of the distributed power generation and storage device as shown in FIG. 5 that is provided from the open data processing unit 230, converts the received open data frame into data suitable for a REST web server protocol, and transmits the data to the energy management server 300 over the Internet.

The Ethernet communication unit 240 receives an Ethernet control signal of the distributed power generation and storage device 100 from the energy management server 300, converts the received control signal into a control signal that may be processed by the gateway central processing unit 220, and provides the converted control signal to the gateway central processing unit 220. Here, the memory 250 receives memory data from the gateway central processing unit 220, stores the received memory data, and provides the memory data to the gateway central processing unit 220 upon a read request.

Here, a detailed configuration and operation of the modular wired/wireless communication unit 210 shown in FIG. 2 will be described with reference to FIG. 3.

As shown in FIG. 3, the modular wired/wireless communication unit 210 may include Ethernet data communication modules 211 and 215, a SUN data communication module 212, an RS-485 Modbus data communication module 213, an Ethernet Modbus data communication module 214, a PLC data communication module 216, and an input data concentrator 217 for the distributed power generation and storage device.

The Ethernet data communication module 211 converts Ethernet reception data received through an Ethernet interface from the photovoltaic module 110 shown in FIG. 1 into Ethernet communication module reception data having an internal data frame format and provides the Ethernet communication module reception data to the input data concentrator 217 for the distributed power generation and storage device.

Also, the Ethernet data communication module 211 receives transmission data (Ethernet communication module control/management data) of the Ethernet data communication module 211 from the input data concentrator 217 for the distributed power generation and storage device, converts the received transmission data into Ethernet transmission data having an Ethernet frame format, and transmits the converted Ethernet transmission data to the photovoltaic module 110 through an Ethernet line.

The SUN data communication module 212 receives SUN reception data of the photovoltaic module 111 in a wireless manner, converts the SUN reception data into SUN communication module reception data having an internal data frame format, and provides the converted data to the input data concentrator 217 for the distributed power generation and storage device.

The SUN data communication module 212 receives SUN communication module transmission data from the input data concentrator 217 for the distributed power generation and storage device, converts the received SUN communication module transmission data into SUN transmission data having an SUN frame format, and transmits the converted SUN transmission data to the photovoltaic module 111 in a wireless manner.

The RS-485 Modbus data communication module 213 receives RS-485 Modbus reception data of the lithium ion battery 120 through an RS-485 line, converts the received RS-485 Modbus reception data into RS-485 Modbus communication module reception data having an internal data frame format, and then provides the converted RS-485 Modbus communication module reception data to the input data concentrator 217 for the distributed power generation and storage device.

The RS-485 Modbus data communication module 213 receives RS-485 Modbus communication module transmission data from the input data concentrator 217 for the distributed power generation and storage device, converts the received RS-485 Modbus communication module transmission data into RS-485 Modbus transmission data having an RS-485 Modbus frame format, and then transmits the RS-485 Modbus transmission data to the lithium ion battery 120 through an RS-485 line.

The Ethernet Modbus data communication module 214 receives Ethernet Modbus reception data of the vanadium redox flow battery 130 through an Ethernet Modbus line, converts the Ethernet Modbus reception data into Ethernet Modbus communication module reception data having an Ethernet data frame format, and provides the converted Ethernet Modbus communication module reception data to the input data concentrator 217 for the distributed power generation and storage device.

The Ethernet Modbus data communication module 214 receives Ethernet Modbus communication module transmission data from the input data concentrator 217 for the distributed power generation and storage device, converts the received Ethernet Modbus communication module transmission data into Ethernet Modbus transmission data having an Ethernet Modbus frame format, and transmits the converted Ethernet Modbus transmission data to the vanadium redox flow battery 130 through an Ethernet Modbus line.

The Ethernet data communication module 215 receives Ethernet reception data of the diesel generator 140 through an Ethernet line, converts the Ethernet reception data into Ethernet communication module reception data having an internal data frame format, and then provides the converted Ethernet communication module reception data to the input data concentrator 217 for the distributed power generation and storage device.

The Ethernet data communication module 215 receives Ethernet communication module transmission data from the input data concentrator 217 for the distributed power generation and storage device, converts the received Ethernet communication module transmission data into Ethernet transmission data having an Ethernet frame format, and transmits the converted Ethernet transmission data to the diesel generator 140 through an Ethernet line.

The PLC data communication module 216 receives PLC reception data of the wind generator 150 through a power line, converts the PLC reception data into PLC communication module reception data having an internal data frame format, and provides the converted PLC communication module reception data to the input data concentrator 217 for the distributed power generation and storage device.

The PLC data communication module 216 receives PLC communication module transmission data from the input data concentrator 217 for the distributed power generation and storage device, converts the received PLC communication module transmission data into PLC transmission data having a PLC frame format, and transmits the converted PLC transmission data to the wind generator 150 through a power line.

Also, the Ethernet data communication module 211, the SUN data communication module 212, the RS-485 Modbus data communication module 213, the Ethernet Modbus data communication module 214, the Ethernet data communication module 215, and the PLC data communication module 216 may be configured as modules that are individually attachable or detachable.

The input data concentrator 217 for the distributed power generation and storage device receives Ethernet communication module reception data from the Ethernet data communication module 211 and receives the SUN communication module reception data from the SUN data communication module 212.

Also, the input data concentrator 217 for the distributed power generation and storage device receives the RS-485 Modbus communication module reception data from the RS-485 Modbus data communication module 213 and receives the Ethernet Modbus communication module reception data from the Ethernet Modbus data communication module 214.

In addition, the input data concentrator 217 for the distributed power generation and storage device receives Ethernet communication module reception data from the Ethernet data communication module 215 and receives the PLC communication module reception data from the PLC data communication module 216.

Thus, the status data respectively provided from the elements of the distributed power generation and storage device 100, that is, the status data provided from the Ethernet data communication module 211, the SUN data communication module 212, the RS-485 Modbus data communication module 213, the Ethernet Modbus data communication module 214, the Ethernet data communication module 215, and the PLC data communication module 216 is sequentially aligned, concentrated, converted into input data for the distributed power generation and storage device, and then provided to the gateway central processing unit 220 shown in FIG. 2.

The input data concentrator 217 for the distributed power generation and storage device receives a control signal of the photovoltaic module 110 from the gateway central processing unit 220, performs conversion into Ethernet communication module transmission data for controlling and setting up the photovoltaic module 110, and provides the Ethernet communication module transmission data to the Ethernet data communication module 211.

The input data concentrator 217 for the distributed power generation and storage device receives a control signal of the photovoltaic module 111 from the gateway central processing unit 220, performs conversion into SUN communication module transmission data for controlling and setting up the photovoltaic module 111, and provides the converted SUN communication module transmission data to the SUN data communication module 212.

The input data concentrator 217 for the distributed power generation and storage device receives a control signal of the lithium ion battery 120 from the gateway central processing unit 220, performs conversion into RS-485 Modbus communication module transmission data including control and setup information of the lithium ion battery 120, and provides the converted RS-485 Modbus communication module transmission data to the RS-485 Modbus data communication module 213.

The input data concentrator 217 for the distributed power generation and storage device receives a control signal of the vanadium redox flow battery 130 from the gateway central processing unit 220, performs conversion into Modbus communication module transmission data for controlling and setting up the vanadium redox flow battery 130, and provides the converted Modbus communication module transmission data to the Ethernet Modbus data communication module 214.

The input data concentrator 217 for the distributed power generation and storage device receives a control signal of the diesel generator 140 from the gateway central processing unit 220, performs conversion into Ethernet communication module transmission data for controlling and setting up the diesel generator 140, and provides the converted Ethernet communication module transmission data to the Ethernet data communication module 215.

The input data concentrator 217 for the distributed power generation and storage device receives a control signal of the wind generator 150 from the gateway central processing unit 220, performs conversion into PLC communication module transmission data for controlling and setting up the wind generator 150, and provides the converted PLC communication module transmission data to the PLC data communication module 216.

Here, a detailed configuration and operation of the open data processing unit 230 shown in FIG. 2 will be described with reference to FIG. 4.

As shown in FIG. 4, the open data processing unit 230 may include an open data reception queue 231, an open data converter 232, and an open data transmission queue 233.

The open data reception queue 231 receives monitoring status data for each element of the distributed power generation and storage device 100 from the gateway central processing unit 220 shown in FIG. 2, stores the received monitoring status data, converts the stored status data into open reception data, and then provides the converted open reception data to the open data converter 232.

The open data converter 232 receives the open reception data from the open data reception queue 231, converts the open reception data into open transmission data having a predefined unified data frame format as shown in FIG. 5, which may accommodate various communication protocols such as the Ethernet, Modbus, SUN, and PLC, and provides the converted open transmission data to the open data transmission queue 233.

The open data transmission queue 233 receives the open transmission data from the open data converter 232, converts the received open transmission data into open data for the distributed power generation and storage device suitable for a REST web server protocol, and performs a function of transmitting the converted open data for the distributed power generation and storage device to the Ethernet communication unit 240.

As a result, the micro-grid energy management system according to an embodiment of the present disclosure selectively allows the distributed power generation and storage device including the photovoltaic modules, the lithium ion battery, the vanadium redox flow battery, the diesel generator, and the wind generator to be removably connected through different wired/wireless communication interfaces and also allows the monitoring and functional control/setup of the connected distributed power generation and storage device.

Also, the micro-grid energy management system according to an embodiment of the present disclosure allows conversion into open data having a unified data frame format that may accommodate various communication protocols such as the Ethernet, Modbus, SUN, and PLC by installing the modular Ethernet data communication module, the modular SUN data communication module, the modular RS-485 Modbus data communication module, the modular Ethernet Modbus data communication module, the modular PLC data communication module in a gateway in order for a plurality of distributed power generation and storage devices to be connected through the different wired/wireless communication interfaces.

The micro-grid energy management system according to an embodiment of the present disclosure can provide a function of monitoring a plurality of distributed power generation and storage devices, which are elements of a micro-grid, that is, a photovoltaic module, a lithium ion battery, a vanadium redox flow battery, a diesel generator, and a wind generator.

Also, the micro-grid energy management system can provide a function of controlling and setting up the distributed power generation and storage devices and provide various wired/wireless communication schemes.

In addition, the micro-grid energy management system can provide the modular Ethernet data communication module, the modular SUN data communication module, the modular RS-485 Modbus data communication module, the modular Ethernet Modbus data communication module, and the modular PLC data communication module that are individually attachable or detachable.

Furthermore, the micro-grid energy management system can provide a function of accommodating various communication protocols such as the Ethernet, Modbus, SUN, or PLC to perform conversion into open data having a unified data frame.

Moreover, the micro-grid energy management system can provide a function of converting the open data having the unified data frame format according to a REST web server protocol and transmitting the open data to the micro-grid energy management system over the Internet.

As a result, according to an embodiment of the present disclosure, the micro-grid energy management system can accommodate various communication protocols to perform conversion into open data having a unified data frame format, convert the open data having the unified data frame format according to the REST web server protocol, and transmit the open data over the Internet.

As described above, the micro-grid energy management system according to an embodiment of the present disclosure has been described according to preferred embodiments. However, the present disclosure is not limited to the preferred embodiments. It should be obvious to those skilled in the art that there are many various modifications and variations without departing from the spirit or the technical scope of the appended claims.

Accordingly, the embodiments of the present disclosure are to be considered descriptive and not restrictive of the present disclosure, and do not limit the scope of the present disclosure. The scope of the present disclosure should be determined by the following claims and their appropriate legal equivalents.

What is claimed is:

1. A micro-grid energy management system comprising:
  a plurality of distributed power generation and storage devices each configured to generate and store power in a distributed manner, monitor its own status, and transmit data on the monitored status through a different interface;
  a gateway device connected selectively with the plurality of distributed power generation and storage devices through different interfaces and configured to convert the status data received through the interfaces into open data having one predefined data frame format, transmit the converted open data over a network, and provide control signals of the plurality of distributed power generation and storage devices received over the network to the plurality of distributed power generation and storage devices; and
  an energy management server configured to perform energy management using the open data transmitted from the gateway device over the network and transmit control signals for controlling and managing the distributed power generation and storage devices to the gateway device over the network.

2. The micro-grid energy management system of claim 1, wherein the plurality of distributed power generation and storage devices are selectively attachable to or detachable from the gateway device.

3. The micro-grid energy management system of claim 1, wherein the plurality of distributed power generation and storage devices comprise:
  a plurality of photovoltaic modules connected with the gateway device through an Ethernet communication interface and a wireless interface;
  a lithium ion battery connected with the gateway device through an RS-485 Modbus communication interface;
  a vanadium redox flow battery connected with the gateway device through an Ethernet Modbus communication interface;
  a diesel generator connected with the gateway device through an Ethernet communication interface; and
  a wind generator connected with the gateway device through a PLC power communication interface.

4. The micro-grid energy management system of claim 3, wherein the gateway device comprises:
  a modular wired/wireless communication unit configured in a modular form so that the gateway device is connected with each of the plurality of distributed power generation and storage devices through each of the different communication interfaces, and configured to respectively receive the status data of the plurality of distributed power generation and storage devices through the communication interfaces and selectively transmit control signals for controlling each of the distributed power generation and storage devices to the distributed power generation and storage devices;
  a gateway central processing unit configured to convert the status data of the plurality of distributed power generation and storage devices received through the modular wired/wireless communication unit into transmission data, output the converted transmission data, and provide the control signals of the distributed power generation and storage devices transmitted from the energy management server to the modular wired/wireless communication unit,
  an open data processing unit configured to convert the transmission data converted by the gateway central processing unit into a predefined open data frame, convert the converted open data frame into open data corresponding to a representational state transfer (REST) web server protocol, and output the converted open data; and
  an Ethernet communication unit configured to convert the open data output from the open data processing unit into Ethernet data, transmit the Ethernet data to the energy management server over the Internet, and provide Ethernet control signals of the plurality of distributed power generation and storage devices transmitted from the energy management server to the gateway central processing unit.

5. The micro-grid energy management system of claim 4, wherein the status data includes at least one of ID information, monitoring item information, status information, and monitoring time information of the plurality of distributed power generation and storage devices.

6. The micro-grid energy management system of claim 5, wherein the status information includes at least one of power generation information, power storage information, and power charging/discharging information.

7. The micro-grid energy management system of claim 4, wherein the modular wired/wireless communication unit comprises:
  a plurality of communication modules respectively connected with the plurality of distributed power generation and storage devices through corresponding communication interfaces and configured to respectively receive the status data transmitted from the plurality of distributed power generation and storage devices through the communication interfaces; and
  an input data concentrator configured to align and concentrate the status data of the plurality of distributed power generation and storage devices respectively received through the communication modules in an input order, provide the aligned and concentrated status data to the gateway central processing unit, and provide the control signals provided from the gateway central processing unit so that the control signals are selectively transmitted to the communication modules.

8. The micro-grid energy management system of claim 4, wherein the open data processing unit comprises:

an open data reception queue configured to temporarily store the status data of the plurality of distributed power generation and storage devices provided from the gateway central processing unit and then output the stored status data;

an open data converter configured to convert the status data of the plurality of distributed power generation and storage devices output from the open data reception queue into a predefined open data frame and output the converted open data frame; and an open data transmission queue configured to temporarily store the data frame converted by the open data converter and then provide the stored data frame to the Ethernet communication unit.

9. The micro-grid energy management system of claim 8, wherein the predefined open data frame includes a field including ID information of the plurality of distributed power generation and storage devices, a field including monitoring item information of the plurality of distributed power generation and storage devices; a field including status information of the plurality of distributed power generation and storage devices; and a field including monitoring time information for monitoring items of the plurality of distributed power generation and storage devices.

10. A gateway device of a micro-grid energy management system, the gateway device comprising:
a modular wired/wireless communication unit configured in a modular form so that the gateway device is respectively connected with a plurality of distributed power generation and storage devices through different communication interfaces, and configured to respectively receive the status data of the plurality of distributed power generation and storage devices through the communication interfaces and selectively transmit control signals for controlling each of the distributed power generation and storage devices to the plurality of distributed power generation and storage devices;

a gateway central processing unit configured to convert the status data of the plurality of distributed power generation and storage devices received through the modular wired/wireless communication unit into transmission data, output the converted transmission data, and provide the control signals of the distributed power generation and storage devices transmitted from an energy management server to the modular wired/wireless communication unit;

an open data processing unit configured to convert the transmission data converted by the gateway central processing unit into a predefined open data frame, convert the converted open data frame into open data corresponding to a representational state transfer (REST) web server protocol, and output the converted open data; and an Ethernet communication unit configured to convert the open data output from the open data processing unit into Ethernet data, transmit the Ethernet data to the energy management server over the Internet, and provide Ethernet control signals of the plurality of distributed power generation and storage devices transmitted from the energy management server to the gateway central processing unit.

11. The gateway device of claim 10, wherein the status data includes at least one of ID information, monitoring item information, status information, and monitoring time information of the plurality of distributed power generation and storage devices.

12. The gateway device of claim 11, wherein the status information includes at least one of power generation information, power storage information, and power charging/discharging information.

13. The gateway device of claim 10, wherein the modular wired/wireless communication unit comprises:
a plurality of communication modules respectively connected with the plurality of distributed power generation and storage devices through corresponding communication interfaces and configured to respectively receive the status data transmitted from the plurality of distributed power generation and storage devices through the communication interfaces; and an input data concentrator configured to align and concentrate the status data of the plurality of distributed power generation and storage devices respectively received through the communication modules in an input order, provide the aligned and concentrated status data to the gateway central processing unit, and provide the control signals provided from the gateway central processing unit so that the control signals are selectively transmitted to the communication modules.

14. The gateway device of claim 13, wherein the plurality of communication module comprises:
an Ethernet data communication module configured to transmit or receive data to or from the plurality of distributed power generation and storage devices through an Ethernet interface;
a wireless data communication module configured to transmit or receive data to or from the plurality of distributed power generation and storage devices through a wireless interface;
an RS-485 Modbus data communication module configured to transmit or receive data to or from the plurality of distributed power generation and storage devices through an RS-485 Modbus communication interface;
an Ethernet Modbus data communication module configured to transmit or receive data to or from the plurality of distributed power generation and storage devices through an Ethernet Modbus communication interface; and
a PLC data communication module configured to transmit or receive data to or from the plurality of distributed power generation and storage devices through a PLC power line.

15. The gateway device of claim 10, wherein the open data processing unit comprises:
an open data reception queue configured to temporarily store the status data of the plurality of distributed power generation and storage devices provided from the gateway central processing unit and then output the stored status data;
an open data converter configured to convert the status data of the plurality of distributed power generation and storage devices output from the open data reception queue into a predefined open data frame and output the converted open data frame; and
an open data transmission queue configured to temporarily store the data frame converted by the open data converter and then provide the stored data frame to the Ethernet communication unit.

16. The gateway device of claim 15, wherein the predefined open data frame includes a field including ID information of the plurality of distributed power generation and storage devices, a field including monitoring item information of the plurality of distributed power generation and storage devices; a field including status information of the plurality of distributed power generation and storage devices; and a field including monitoring time information for monitoring items of the plurality of distributed power generation and storage devices.

17. The gateway device of claim 10, wherein the modular wired/wireless communication unit is configured in a modular form to be attachable to or detachable from the plurality of distributed power generation and storage devices.

* * * * *